Dec. 2, 1969          S. LA MACCHIA          3,481,213
QUICK TRAVERSE MACHINE TOOL ACCESSORY APPARATUS
Filed Sept. 11, 1967                         2 Sheets-Sheet 1

Inventor:
Salvatore LaMacchia,
by John E. Toupal
Attorney

Dec. 2, 1969  S. LA MACCHIA  3,481,213
QUICK TRAVERSE MACHINE TOOL ACCESSORY APPARATUS
Filed Sept. 11, 1967  2 Sheets-Sheet 2

Inventor:
Salvatore LaMacchia,
by John E. Toupal
Attorney

United States Patent Office 3,481,213
Patented Dec. 2, 1969

3,481,213
QUICK TRAVERSE MACHINE TOOL
ACCESSORY APPARATUS
Salvatore La Macchia, 180 Western Ave.,
Sherborn, Mass. 01770
Filed Sept. 11, 1967, Ser. No. 666,897
Int. Cl. F16h 15/02
U.S. Cl. 74—202
10 Claims

ABSTRACT OF THE DISCLOSURE

A quick traverse accessory having a lever operated friction gear member mounted for axial movement on the drive shaft of the accessory motor. Facing conical drive surfaces on the friction gear member straddle the conical face of a drive pulley and permit bi-directional rotation thereof in response to actuation of the lever.

---

This invention relates generally to an accessory for use with machine tools such as milling machines and, more specifically, relates to a "quick traverse" accessory for machines of that type.

There exist many types of machine tools having a reciprocable table which moves a supported work piece relative to a work tool such as a milling cutter. Because the cutting operations must necessarily be performed at slow speeds, the power units for such machines normally are designed to drive the work table at relatively low linear rates of, for example, 40 inches per minute or less. However, many machine tools are equipped with a so called "quick traverse" mechanism that permits an operator to selectively drive the work table at relatively high speeds of, for example, 70 inches per minute or more. These quick traverse mechanisms are generally used to return the work table to a preselected start position at high speed after completion of a low speed cutting pass. In this way the total elapsed time required for each cutting cycle can be reduced and the total output of the machine increased.

Although desirable in most applications, a great many machine tools are built and used which do not posses the quick traverse capability. The primary reason for this is that commercially available machines having quick traverse capability are relatively complicated and therefore excessively expensive. The substantially higher cost renders the machines economically unsuitable for many applications, particularly those in which a machine is not in continuous operation. However, even in these latter circumstances the quick traverse capability would be a useful and desirable feature if available at a reasonable cost.

The object of this invention, therefore, is to provide a low cost accessory which can be quickly and easily combined with existing machine tools to provide them with quick traverse capability.

One feature of this invention is the provision of a quick traverse machine tool accessory having an electric motor supporting frame adapted for attachment to the reciprocable table of a machine tool and a coupling adapted for operatively connecting the motor's drive shaft to the machine tool's table screw. The coupling includes a drive member for sequentially driving the table screw in opposite directions responsive to selective manual actuation of a multi-position clutch. This arrangement provides an inexpensive quick traverse accessory which can be quickly and easily incorporated with conventional commercially available machine tools.

Another feature of this invention is the provision of a quick traverse machine tool accessory of the above featured type wherein the clutch is operable to produce selective rotation of the drive member in opposite directions in response to a single direction of motor rotation. The opposite drive directions provided by the clutch permit the use of economical non-reversible drive motors.

Another feature of this invention is the provision of a quick traverse machine tool accessory of the above featured type wherein the drive member is a friction wheel member adapted for mounting on the machine tool's table screw and the clutch member has facing drive surfaces which straddle the friction wheel member and rotate with the motor's drive shaft. Selective actuation of the clutch produces a desired direction of table screw rotation by inducing engagement between the friction wheel member and only one of the drive surfaces.

Another feature of this invention is the provision of a quick traverse machine tool accessory of the above featured type wherein the motor's drive shaft is substantially perpendicular to the table screw and actuation of the clutch member causes axial movement thereof on the motor's drive shaft to initiate contact with the drive friction wheel member. This particular clutch arrangement permits selective actuation of the work table with a minimum required component cost.

Another feature of this invention is the provision of a quick traverse machine tool accessory of the above featured type wherein the friction wheel member has a conical face and the clutch drive surfaces are formed by conical portions having bases facing away from each other. Extreme efficient bi-directional motion transmission is provided by a clutch member of this type.

Another feature of this invention is the provision of a quick traverse machine tool accessory of the above featured type including a spring member which normally biases the clutch in a neutral position wherein neither of its drive surfaces are operatively engaged with the drive friction wheel member. The spring member produces automatic disengagement of the clutch member and prevents inadvertent initiation of quick traverse operation.

Another feature of this invention is the provision of a quick traverse machine tool accessory of the above featured type including an annular urethane band secured to the conical face of the friction wheel member and adapted for operative engagement with the drive surfaces of the clutch. An extremely effective and stable drive is obtained by utilization of the resilient urethane band.

Another feature of this invention is the provision of a quick traverse machine tool accessory of the above featured type including a manual lever actuator having a rotatable terminal portion engageable with the clutch and adapted to produce axial movement thereof on the motor's drive shaft in a direction dependent upon the direction of lever actuation. This arrangement permits bi-directional actuation of the clutch with a single operating lever thereby simplifying both construction and operation of the device.

These and other features and obects of the present invention will become more apparent upon a perusal of the following specification taken in conjunction with the accompanying drawings wherein.

Figure 1:
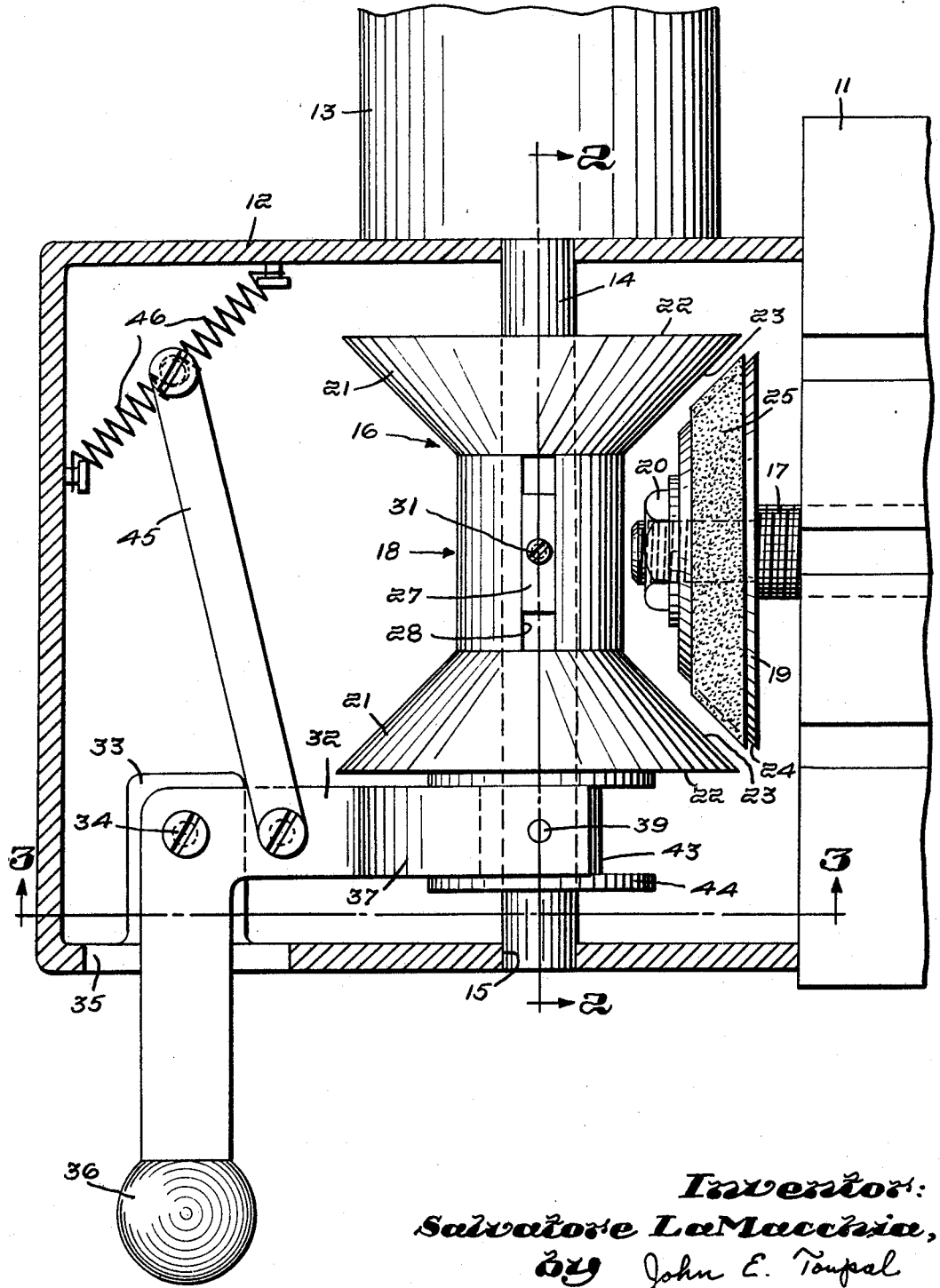
FIG. 1 is a schematic plan view, partially in cross-section, illustrating a preferred embodiment of the invention.

Referring now to the figures, there is partially shown the reciprocable work table 11 of a conventional "Bridgeport" type milling machine. Demountably attached to an end of the frame 11 is the accessory housing frame 12 which supports the electrical drive motor 13. Associated with the motor 13 is the drive shaft 14 having a free end supported in the bearing aperture 15 of the accessory housing 12.

The coupling 16 transmits rotary motion of the drive shaft 14 to the table screw 17 which, in the conventional manner, is mounted for reciprocating movement with the table frame 11 of the milling machine. Included in the coupling 16 are the clutch member 18 and the friction wheel member 19 which is secured to the table screw 17 by the nut 20. The clutch member 18 has conically shaped end portions 21 with bases 22 which face away from each other. The drive surfaces 23 of the conical clutch portions 21 straddle and are parallel to the conical face 24 of the driven friction wheel member 19. Tightly adhered to the conical face 24 is the band of resilient material 25 which preferably comprises urethane.

Figure 2:
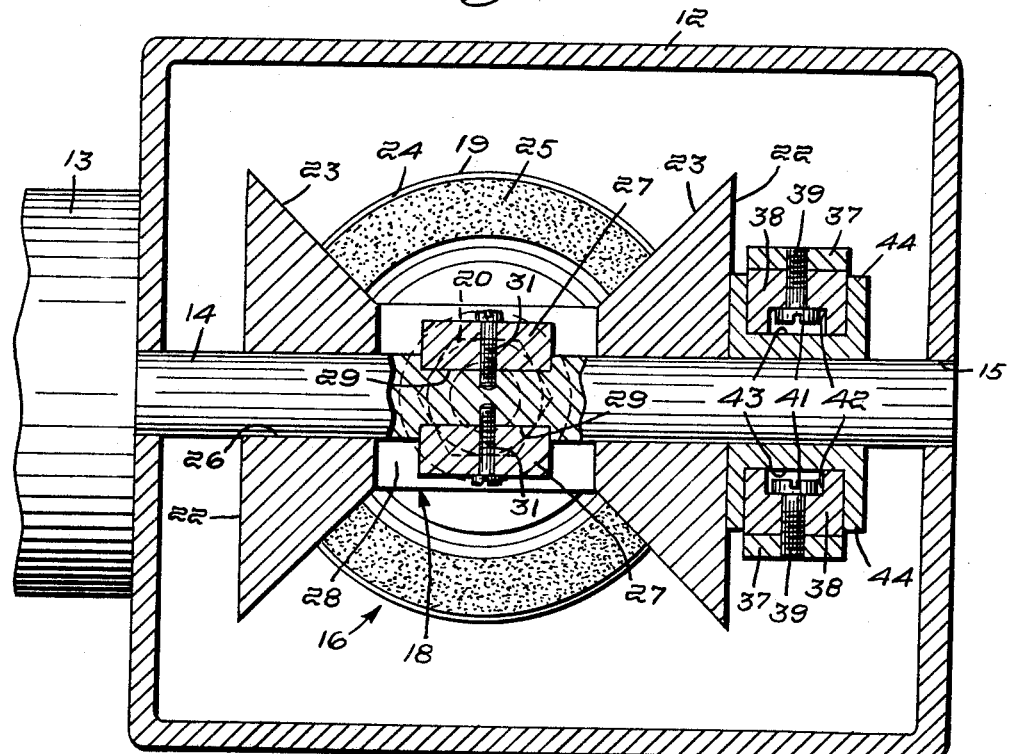
FIG. 2 is a cross-sectional view taken along lines 2—2 of FIG. 1.
Figure 3:
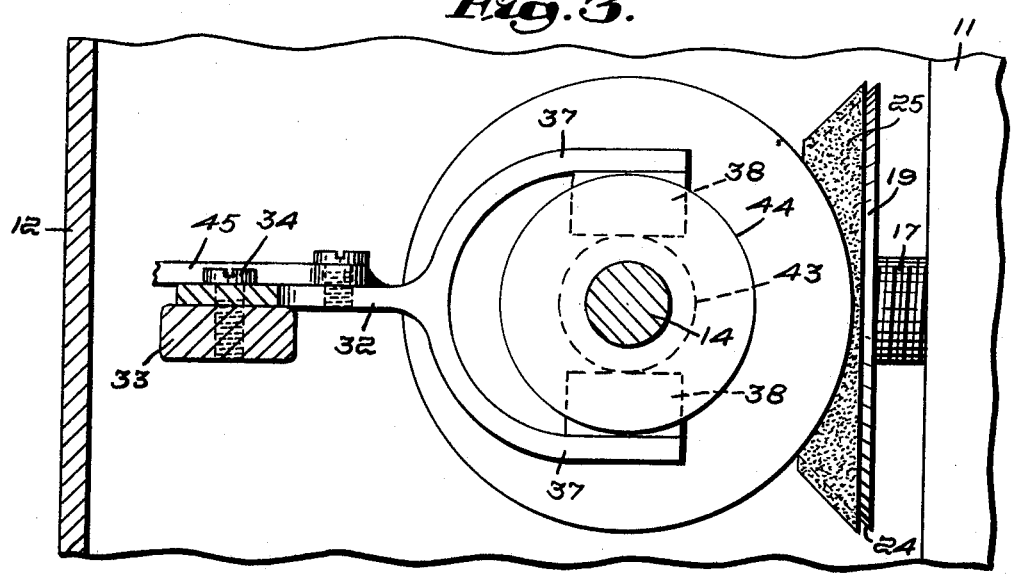
FIG. 3 is a cross-sectional view taken along lines 3—3 of FIG. 1.

As shown in FIG. 2, the clutch member 18 has an axial bore 26 which accommodates the drive shaft 14. The clutch member 18 is keyed to the drive shaft 14 by the keys 27 located in the clutch keyway 28 and extending into the shaft slots 29. The keys 27 are secured within the shaft slots 29 by the machine screws 31. As shown, the length of the keyway 28 is substantially greater than those of the keys 27 thereby permitting axial movement of the clutch member 18 on the drive shaft 14.

The actuating lever 32 is pivotally attached to the support block 33 by the pivot pin 34. Attached to the free end of the lever 32 which projects through an opening 35 in the housing 12 is the actuating knob 36. The opposite end of the lever 32 has bifurcated terminations 37 which support the rotatable hollow cylindrical bearings 38. Securing the hollow bearings 38 to the bifurcations 37 are the machine screws 39 having heads 41 recessed in the bearing counterbores 42. The bearings 38 project into the annular central recess 43 of the collar 44 which encircles the drive shaft 14 and is attached for axial movement with the clutch member 18. Pivotally connected to the lever 32 adjacent the pivot pin 34 is one end of the idle arm 45. The idle springs 46 have ends connected between the opposite end of the idle arm 45 and the accessory housing 12.

During operation of the invention, energization of the motor 13 produces rotation of the drive shaft 14 and keyed clutch member 18. Normal biasing provided by the idle springs 46 through the idle arm 45 maintains the lever 32 in the idle position shown in FIG. 1. In this position the table screw 17 is uncoupled from the drive shaft 14 because of the spacing existing between the clutch drive surfaces 23 and the resilient band 25 on the pulley face 24. Thus, the work table is unencumbered and can be manipulated by the operator in the conventional manner.

However, whenever desired, the operator merely actuates the lever 32 to produce selective rapid traverse of the table 11 in either direction. For example, movement of the knob 36 to the left, as shown in FIG. 1, against the force of the biasing springs 46 causes clockwise rotation of the lever 32 and produces a downward thrust on the collar 44 by the bearings 38. This induces axial movement of the collar 44 and attached clutch member 18 and brings the upper drive surface 23 into engagement with the urethane band 25. Responsive to the engagement, clockwise rotation of the clutch member 18 is transmitted into counterclockwise rotation of the friction wheel member 19 and attached table screw 17 thereby producing movement of the work table 11 in a given direction.

Conversely, movement of the knob 36 to the right against the biasing force provided by the idle springs 46 causes counterclockwise rotation of the lever 32. Accordingly, an upward thrust is exerted by the bearings 38 against the collar 44 and attached clutch member 18. The resultant upward movement of the clutch member 18 effects engagement between the lower clutch drive surface 23 and the urethane band 20. Responsive to this engagement the clockwise clutch rotation produces similar clockwise rotation of the friction wheel 19 and attached table screw 17 thereby inducing movement of the work table 11 in the opposite direction. In either case, after release of the knob 36, the idle springs 46 exert, through the idle arm 45, a force which returns the clutch member 18 to the idle position shown in FIG. 1 thereby deactivating the quick traverse unit.

Thus, the present invention provides an inexpensive unit which can be quickly and easily attached to existing machine tools so as to provide them with quick traverse capability. Furthermore, the invention permits selective bi-directional table traversal responsive to actuation of a convenient and easily operated lever mechanism. Accessories built according to the above description can provide high quick traverse speeds of, for example, 225 inches per minute. In addition, because of its relative simplicity, the unit is extremely reliable and relatively immune to mechanical failures.

What is claimed is:

1. A machine comprising a horizontally reciprocable frame means, a drive screw mounted for reciprocating movement with said frame means, an accessory frame attached to said reciprocable frame means, an electrical motor supported by said accessory frame, a drive shaft operatively connected to said motor means, coupling means comprising a drive member operatively coupled to said drive screw, said coupling means further comprising gear means for producing selective engagement between said drive shaft and said drive member, and manually operable actuator means for actuating said gear means so as to produce rotation of said drive screw in response to rotation of said drive shaft.

2. A machine according to claim 1 wherein in response to selective actuation by said actuator means said coupling means is adapted to produce rotation of said drive member in either direction responsive to rotation of said drive shaft in a single direction.

3. A machine according to claim 2 wherein said drive member comprises a friction wheel member coupled to said drive screw, and said gear means is attached for rotation with said drive shaft and comprises facing drive surfaces which straddle said friction wheel member, said gear means being movable by said actuator means in opposite directions so as to produce selective operative engagement between said friction wheel member and one of said drive surfaces.

4. A machine according to claim 3 wherein said drive shaft is substantially perpendicular to said drive screw and said gear means is adapted for axial movement on said drive shaft in response to selective operation of said actuator.

5. A machine according to claim 4 wherein said friction wheel member has a conical face and said drive surfaces are conically shaped and adapted to engage said friction wheel member conical face along substantially parallel lines of contact.

6. A machine according to claim 5 wherein said drive surfaces are formed by conical gear portions having bases facing away from each other.

7. A machine according to claim 6 including biasing means for biasing said gear means in a neutral position wherein neither of said drive surfaces are operatively engaged with said friction wheel member.

8. A machine according to claim 7 wherein said conical face of said pulley friction wheel member comprises a resilient surface adapted for operative engagement with said drive surfaces.

9. A machine according to claim 8 wherein said resilient surface comprises an annular urethane band secured to said friction wheel member conical face.

10. A machine according to claim 9 wherein said actuator comprises a lever having a rotatable terminal portion engageable with said gear means and adapted to produce axial movement thereof on said drive shaft in response to selective actuation of said lever.

References Cited
UNITED STATES PATENTS

| | | |
|---|---|---|
| 1,430,019 | 9/1922 | Lillibridge. |
| 1,440,303 | 12/1922 | Landback. |
| 1,530,053 | 3/1925 | Mueller. |
| 3,168,773 | 2/1965 | Frye. |
| 3,218,876 | 11/1965 | Berger _____ 74—202 |

FRED C. MATTERN, Jr., Primary Examiner

J. A. WONG, Assistant Examiner